Sept. 2, 1969  R. J. SMITH  3,464,871
LABELING METHOD AND APPARATUS
Filed March 31, 1964  6 Sheets-Sheet 1

INVENTOR.
RUSLON J. SMITH
BY
Charles L. Johnson Jr.
ATTORNEY

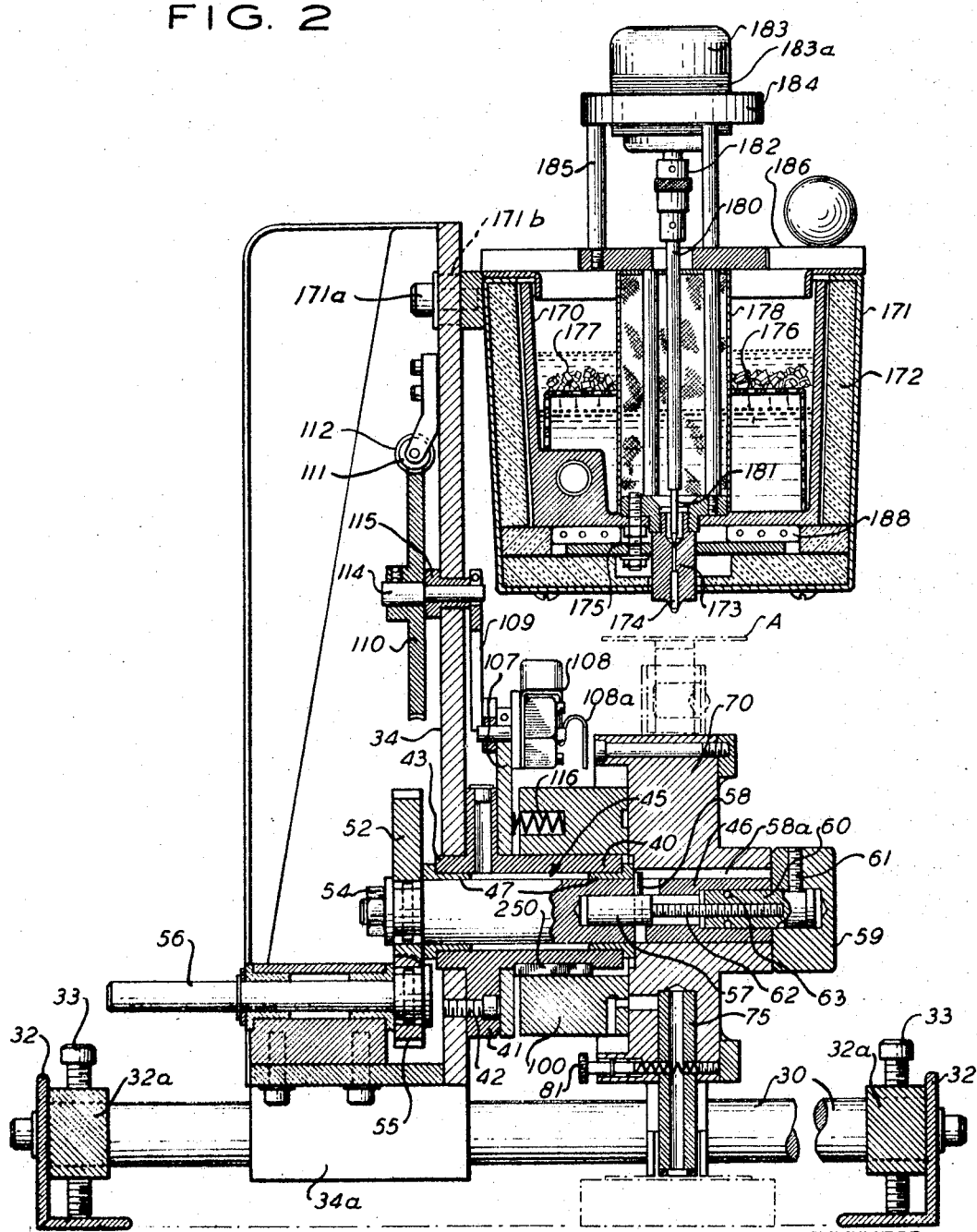

Sept. 2, 1969  R. J. SMITH  3,464,871
LABELING METHOD AND APPARATUS
Filed March 31, 1964  6 Sheets-Sheet 3
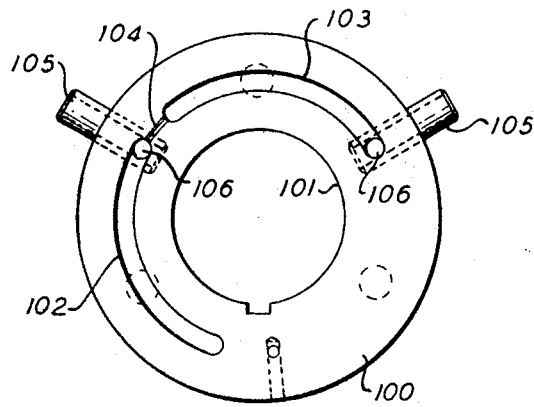
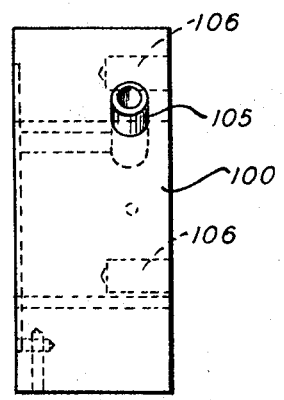
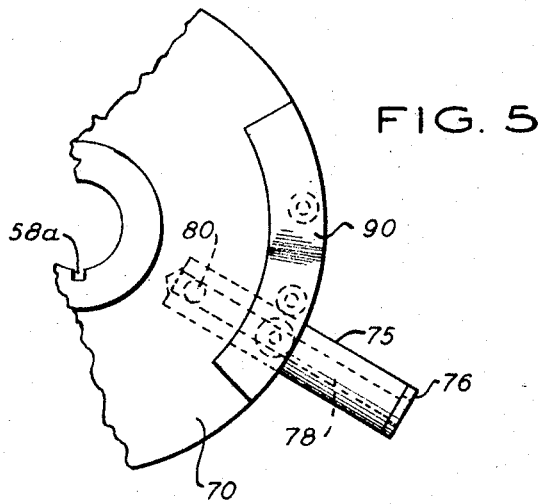
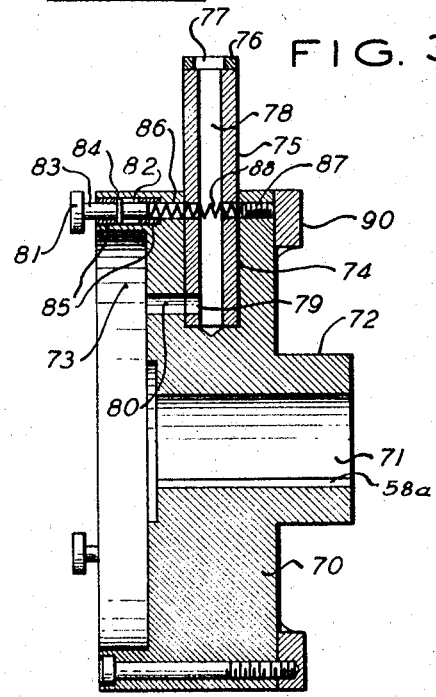
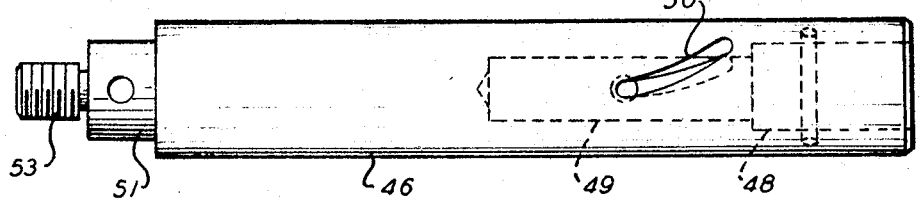
INVENTOR.
RUSLON J. SMITH
BY
Charles L. Johnson Jr.
ATTORNEY

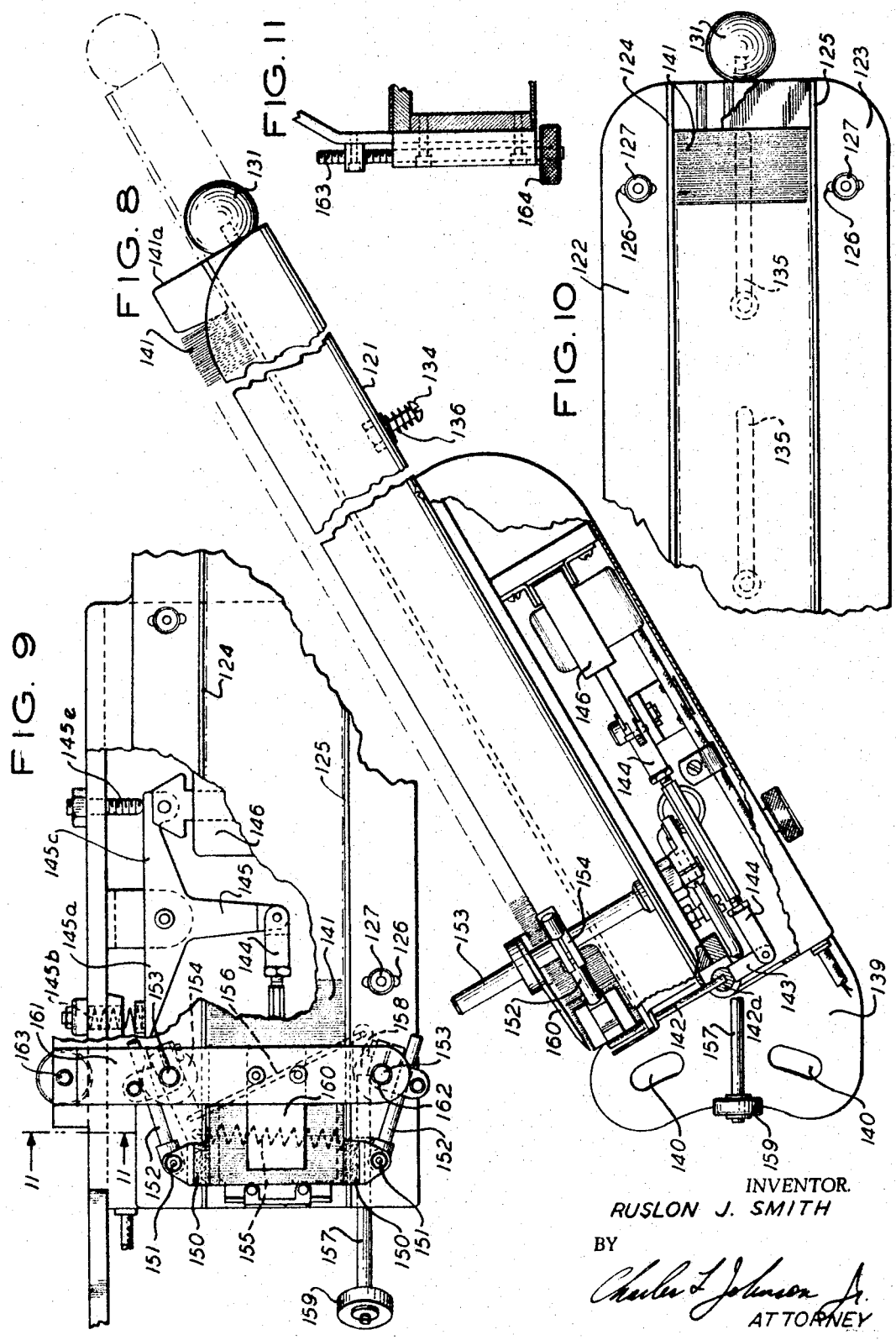

Sept. 2, 1969                R. J. SMITH                3,464,871
LABELING METHOD AND APPARATUS
Filed March 31, 1964
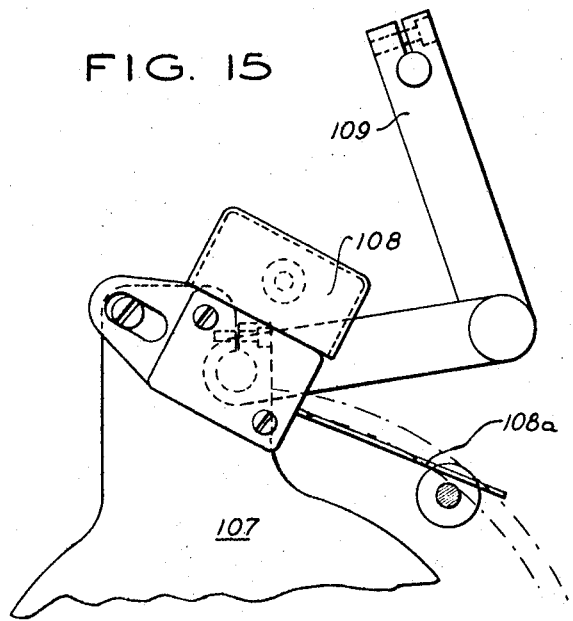
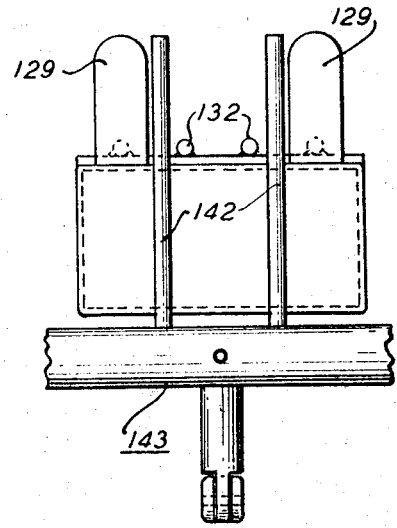
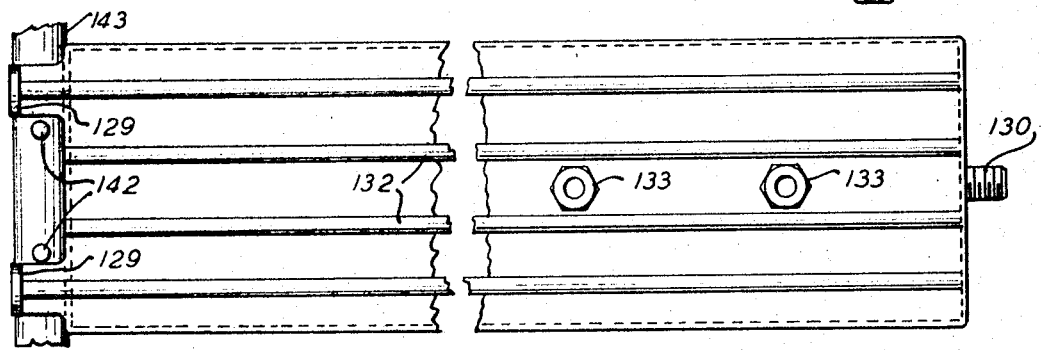
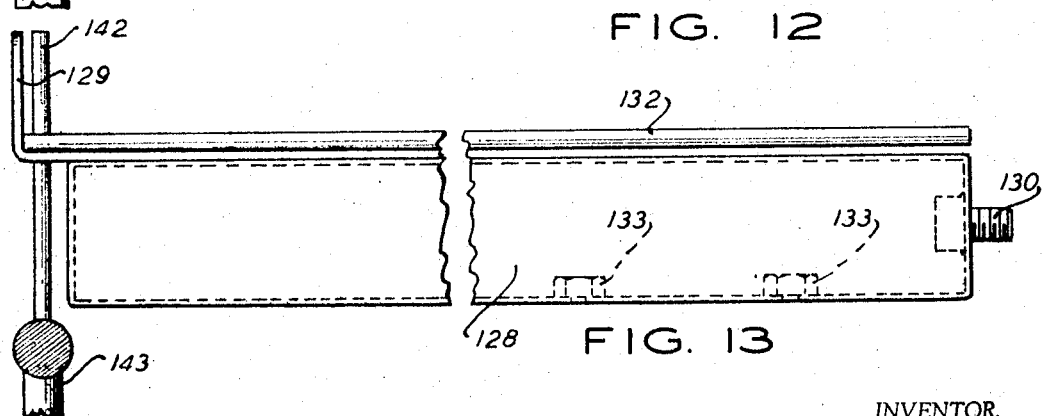
INVENTOR.
RUSLON J. SMITH Sept. 2, 1969           R. J. SMITH           3,464,871
LABELING METHOD AND APPARATUS
Filed March 31, 1964           6 Sheets-Sheet 6
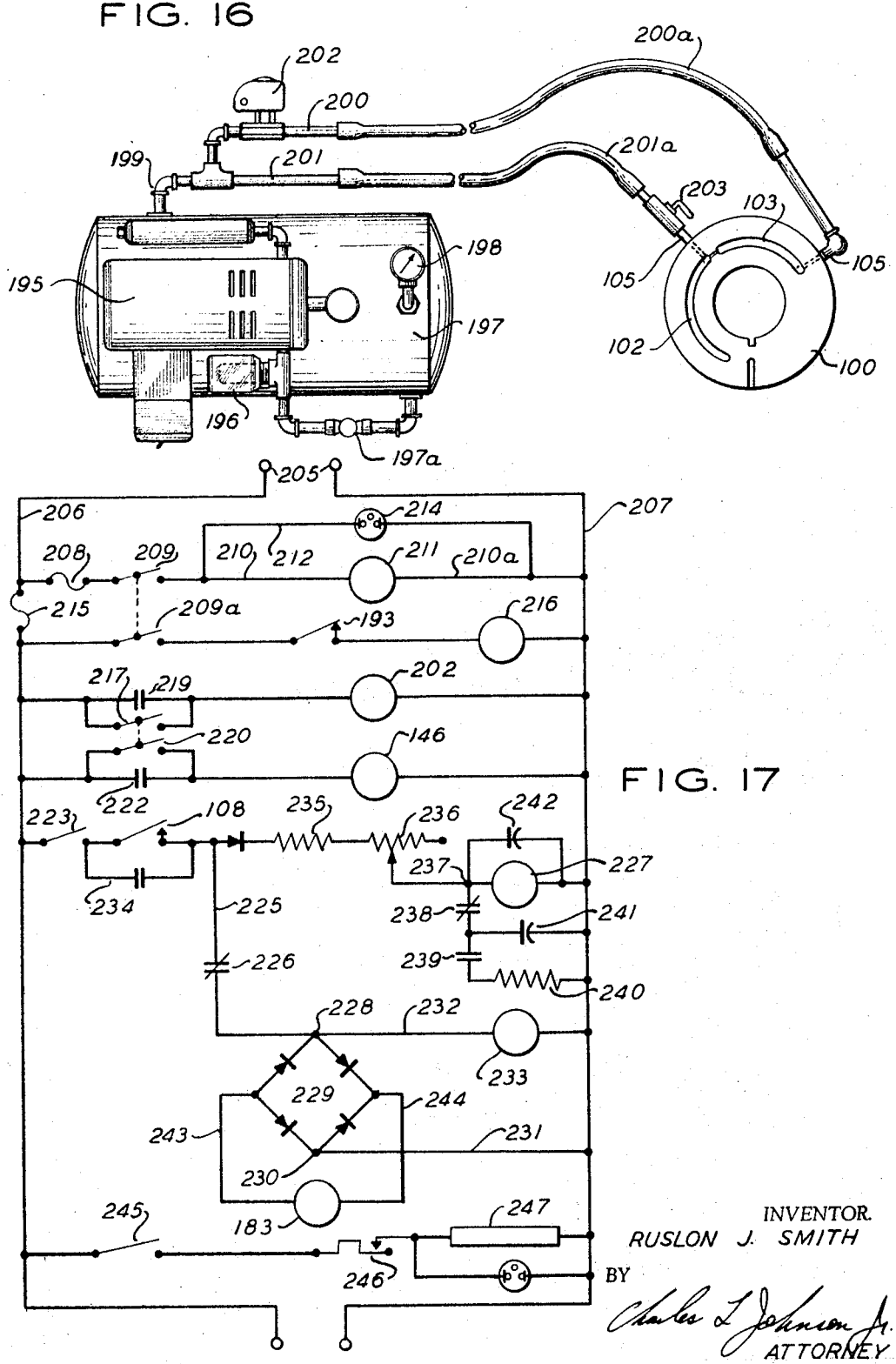
INVENTOR.
RUSLON J. SMITH
BY
Charles L. Johnson Jr.
ATTORNEY United States Patent Office 3,464,871
Patented Sept. 2, 1969

3,464,871
LABELING METHOD AND APPARATUS
Ruslon John Smith, Scranton, Pa., assignor to Eureka-Carlisle Company, a corporation of Delaware
Filed Mar. 31, 1964, Ser. No. 356,306
Int. Cl. B65c 9/40; B32b 31/00
U.S. Cl. 156—60                    38 Claims

ABSTRACT OF THE DISCLOSURE

Apparatus mounting an article carrying conveyor which receives articles from a magazine and a glued label, or the like, from a vacuum wheel disposed for rotation about a horizontal axis. The vacuum wheel mounts a plurality of nozzles each adapted to withdraw a label using a first magnitude of pressure from a stack of labels disposed in a label magazine, and to convey same under a lesser magnitude of pressure passed a glue dispenser, which drops a spot of hot melt glue thereon, and into engagement with the article to be labeled as the pressure is completely relieved. A drive motor and vacuum system are disposed beneath the conveyor. A sensing finger is disposed proximate the article magazine to synchronize label pick-up, and a vacuum operated label senser detects the presence of labels on the vacuum wheel to control release of the glue. The magazine is formed with vibration pads actuated by cams carried by the vacuum wheel to insure proper label feed.

---

This invention relates generally to labeling machines and more particularly to a vacuum port label transfer mechanism associated with a gravity feed adhesive applicator.

One of the primary objects of the invention is to dispense by gravity drops of adhesive, such as wax, downwardly directly upon a label, an interiorly sealed folder, partial or complete band, or other wrap, while they are being transferred by vacuum pick-up means from a discharge point in an associated magazine and after the application of the drop of adhesive, further transfer the same to a position for application to a package or the like, which latter is being fed by synchronized mechanism associated with the adhesive dispenser.

Another object of the invention is to provide a label transfer mechanism in the form of a rotating vacuum wheel which is provided with an array of ports about its periphery, which ports are connected with a source of vacuum and to associate with such a vacuum wheel a label dispenser at one side of the wheel, an adhesive or wax dispenser for discharging regulated drops of adhesive by gravity upon a label or the like at the top of the wheel, and a package transfer mechanism for presenting packages to which the label or the like is to be applied at the bottom of the wheel and approximately at a point generally opposite to the wax drop dispenser.

A further object of the invention is to provide valving means for the vacuum wheel, whereby selected ports may be subject to vacuum for picking up and traveling a label or the like and relieved of vacuum for release of the label or the like in predetermined sequence.

Another object of the invention is the provision of a unit assembly for the valving and the vacuum wheel to facilitate its operation and mounting.

It is a further object of this invention to provide a label magazine for providing a stack of labels adjacent to the vacuum pick-up wheel, the magazine being mounted for adjustment with respect to the wheel to facilitate a pick-up operation and including devices for retaining the second label from the bottom of the stack of labels and for intermittently clamping the labels during the pick-up operation so that only a single label will be available for removal.

It is a further object of this invention to provide means for selectively retracting the stack of labels from their pick-up position should a condition arise where such a procedure is deemed advisable, as in the instance of rearranging the stack with the same or different types of labels or other material to which the adhesive is to be applied.

This invention further contemplates means for automatically supplying packages to a position adjacent and below the vacuum wheel from a magazine or similar source of supply and to associate with the magazine or source of supply a disabling means for controlling the label applying mechanism should the source of supply become depleted.

A further object of the invention is the provision of means for adjusting the adhesive or wax drop dispenser so that the drop of adhesive or wax will be properly positioned with respect to the label or the like and will be properly closely associated therewith in order that the adhesive while in a proper condition will be appropriately applied.

Another object of the invention is the provision of means for applying necessary pressure to the label containing the adhesive while the same is being applied to a package or the like.

More specifically the present invention comprehends controls and adjustments for synchronizing the movement and operation of all of the parts at all times and under all conditions so that the invention will operate continuously to perform its several functions.

These and further objects of the invention will more clearly hereinafter appear by reference to the accompanying drawings forming a part of the instant specification and wherein like characters of reference designate corresponding parts throughout the several views, in which:

FIG. 2 is a transverse sectional view through the adhesive depositing and label applicating apparatus;

FIG. 3 is a vertical section through the vacuum port wheel;

FIG. 4 is an elevation of the shaft assembly for supporting the vacuum port wheel;

FIG. 5 is a fragmentary front elevation showing a portion of the vacuum port wheel including a tubular insert and a projecting cam;

FIG. 6 is a frant elevation of the valve head;

FIG. 7 is a side elevation of the disclosure of FIG. 6;

FIG. 8 is an elevation, partly in section, of the label magazine;

FIG. 9 is an enlarged top plan view of the lower end of the magazine shown in FIG. 8;

FIG. 10 is a fragmentary top plan view of the upper end of the magazine shown in FIG. 9;

FIG. 11 is a transverse section on line 11—11 of FIG. 9;

FIG. 12 is a top plan view of the magazine hopper slide;

FIG. 13 is a side elevation of the disclosure of FIG. 12;

FIG. 14 is an end elevation of the assembly of FIG. 12;

FIG. 15 is an enlarged detailed view of the adjusting plate carrying the microswitch;

FIG. 16 shows the vacuum producing unit; and

FIG. 17 is a diagram of the wiring circuit utilized in the operation of the assembly.

Figure 1:
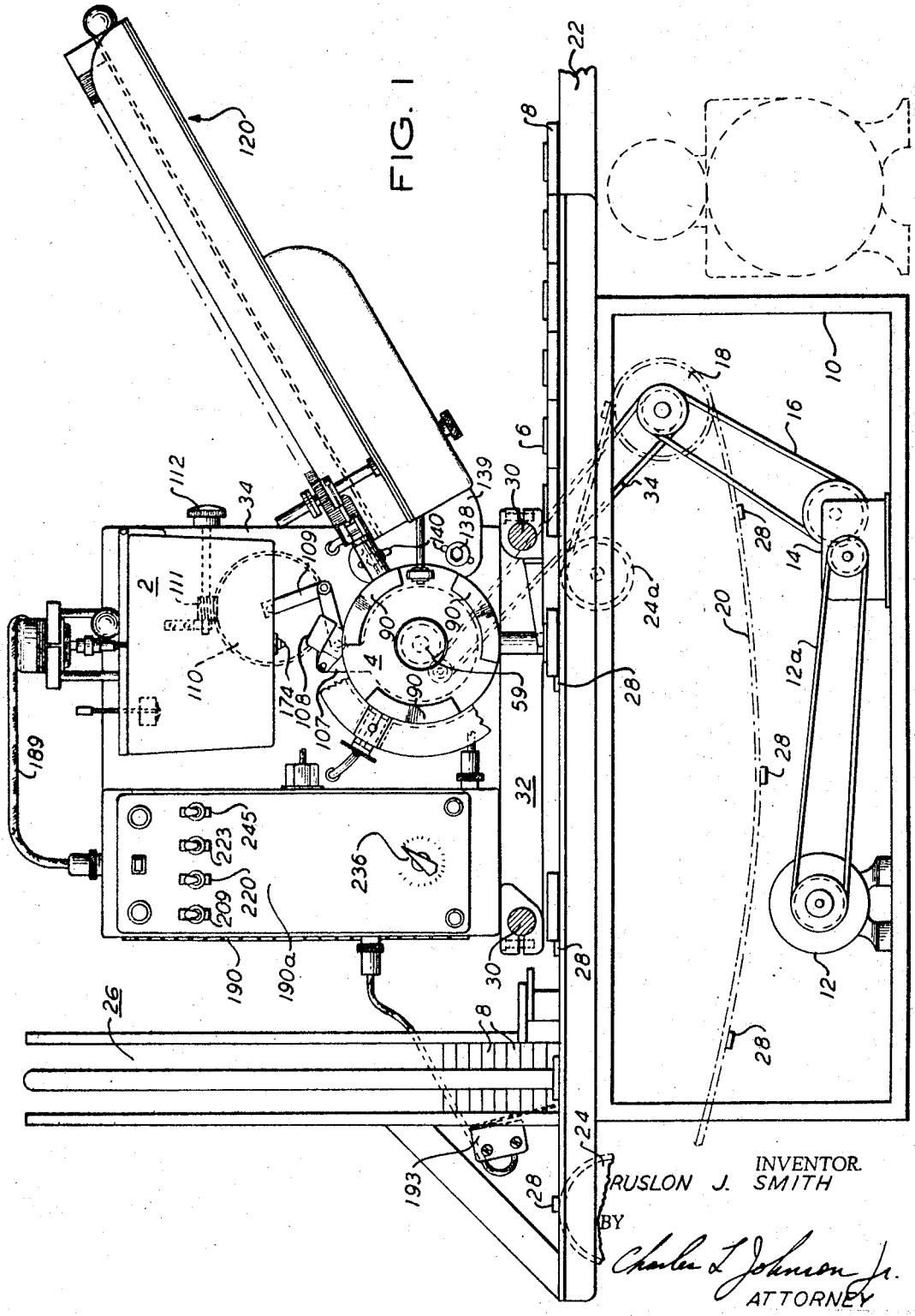
FIG. 1 is a front elevation of the assembly.

FIG. 1 illustrates the basic machine assembly with a wax dropper 2 mounted above a revolving vacuum port wheel 4 which gathers labels 6 from a source to be hereinafter described and transfers the same to an upper position beneath wax dropper 2 for the reception of the adhesive, and after the application of the wax or adhesive continues to a lower position directly aligned below wax dropper 2 for application to the desired object or container 8. As will be seen by reference to FIG. 1, the above parts are mounted on an enclosed stand 10 which houses a drive motor 12, the latter being connected by a drive belt 12a with a gear reducer assembly 14. A chain drive 16 connects the output side of gear reducer assembly 14 with a sprocket wheel 18, which in turn supplies motion to a conveyor chain 20. Conveyor chain 20 is guided along the top and in the plane of a top of the table 22 between idler sprockets 24 and 24a.

A magazine 26 mounted upon one end portion of table 22 with its discharge directly over and symmetric with conveyor chain 20. By this construction the evenly spaced lugs 28 carried by conveyor chain 20 engage the lowermost package or container 8 in magazine 26, to remove same therefrom and move same along the length of table 22 and in the direction of the vacuum port wheel 4 for application of the label, folder or the like to the package, as will be hereinafter described.

It should be noted that lugs 28 of chain 20 are so mounted that when chain 20 is passing through the plane of table 22, lugs 28 will rise above the plane of table 22 and leave this plane at a point where chain 20 is deflected downwardly over idler sprocket 24a.

For mounting the labeling assembly on the top of the supporting structure there is provided a pair of spaced transversely extending supporting rods 30 (FIG. 1 and 2) tied together at their extremities by angle irons 32. Rods 30 are held in alignment by adjustment mounting brackets 32a (FIG. 2) which in turn are held rigid between angle irons 32. Adjusting screws 33 permit the lifting and lowering of the combined structure, including a supporting panel or frame 34, mounted on supporting rods 30, to adjust the height thereof. The individual units of the labeling assembly are mounted on frame 34 which is in turn mounted on blocks 34a sildably supported on rods 30 in clamp-like fashion. By this arrangement, frame 34 may be adjusted with its equipment vertically or transversely as may be required for proper operation.

Mounted on supporting frame 34 is a hub structure 40 including a flange portion 41 secured thereto by suitably spaced bolts 42. Hub structure 40 includes a supporting flange 43 which projects through an opening in frame 34 to strengthen the mount. A concentric bore 45 of hub structure 40 provides a bearing mount for a shaft assembly 46, the bearings for shaft assembly 46 being indicated by reference characters 47. Bearings 47 mount shaft assembly 46 in bore 45 of hub 40 and are positioned in spaced relation, as clearly shown in FIG. 2.

Shaft assembly 46 includes, at one end, a bore 48 (FIG. 4) a counterbore 49 and an arcuate slot 50 extending through the wall of shaft assembly 46 in the area of counterbore 49. The other end of shaft assembly 46 has a reduced portion 51 for mounting a gear 52 (FIG. 2) and a threaded extremity 53 (FIG. 4) for a lock nut assembly 54 (FIG. 4). Gear 52 is keyed to reduced portion 51 of the shaft assembly 46, as best shown in FIG. 2, and power is applied to the gear 52 by a driven gear 55 fixed to an end stub shaft 56. Arranged in counterbore 49 of shaft assembly 46 is a cylindrical adjustment stud 57 with a pin 58 projecting laterally therefrom and into slot 58a in the bore of vacuum wheel 4. Pin 58 is adapted to travel in arcuate slot 50 communicating with counterbore 49. A control knob 59 fixed to the outer end of a cylindrical plug 60 by a set screw 61 actuates adjustment stud 57 by a connecting screw 62. It will be noted that plug 60 actuated by control knob 59 is fixed in bore 48 by a pin 63 or other suitable means so that plug 60 is free to rotate by actuation of the knob 59 but its longitudinal movement is arrested by pin 63. From the foregoing it can readily be seen the turning of knob 59 to the right or left will move pin 58 laterally back and forth within the confines of spiral slot 50, thereby prescribing an angular displacement of vacuum wheel 4 relative to the axis of shaft 46 within approximately thirty-six degrees.

Mounted on shaft 46 is vacuum wheel assembly 4 (FIGS. 2 and 3) which includes an annular wheel-like structure 70 having a central bore 71 (FIG. 3) with a projecting hub portion 72 at its outer side and an annular recess 73 at its opposite inner side. Wheel structure 70 is provided with three radial bores 74 positioned equidistance about th ecircumference of the wheel 70 and in which there are prefitted tubular inserts 75 of steel or other suitable material which project outwardly beyond the circumference of wheel structure 70 and are provided with resilient pads 76 formed with centeral recesses 77 aligned with bores 78 formed in inserts 75. The inner end portions of steel inserts 75 are formed with lateral ports 79 which register with transverse ports 80 extending through the adjacent recessed wall portion of the wheel structure 70. By this means there is a passageway extending from transverse ports 80 in wheel 70 outwardly through inserts 75 and resilient pads 76 at the outer terminals of steel inserts 75.

Actuator pins 81 are associated with each of the steel inserts 75. Actuator pins 81 are appropriately spaced and extend transversely through bores 82 formed in the rim of wheel structure 70 defining the recess 73 at the inside of wheel structure 70. Shanks 83 of pins 81 have snap rings 84 fixed at an appropriate position along their length and between two spaced bronze bearings 85 arranged in bores 82. The axes of bores 82 coincide with the position of each of the inserts 75. Bore 82 communicates with a reduced bore 86 which extends entirely through the balance of wheel structure 70 and accordingly penetrates inserts 75, as shown in FIG. 3. The outer portion of reduced bore 86 is threaded and receives a set screw 87 which forms a retainer for a compression spring 88, urging actuator pin 81 to its outer position.

Ramp-like cams 90 (FIGS. 2 and 3) are mounted in spaced relation on the outer face of the wheel 70 adjacent its periphery and in the area of the axes of inserts 75. Wheel structure 70 has a key-way 58a formed in its bore for the purpose to be herenafter described.

A valve head 100 (FIGS. 2 and 6) is formed with a bore 101 (FIG. 6) having a splined mounting 250 (FIG. 2) adapted for disposition on hub structure 40, heretofore described, and is further provided with a pair of arcuate grooves 102 (FIG. 4) and 103 prescribing an arc of one hundred degrees each and connected with each other by a reduced V-groove 104. Tubular outlets 105, spaced one hundred twenty degrees apart, extend laterally from valve head 100 a sufficient length to receive hose connections. The inner ends of outlets 105 within valve head 100 are in communication with grooves 102 and 103 by flow holes 106.

Referring to FIG. 2, it will be noted that hub 40 operates as a fulcrum for an adjustable switch control plate 107 which carries a microswitch 108 which in turn is adjustable through a linkage 109 controlled by a worm gear 110, a worm 111 and a control knob 112. It will be noted that worm 111 is fixed to the shaft controlled by knob 112 and is in mesh with worm gear 110 which is fixed to a stub shaft 114 held in a bearing bushing 115 which in turn is mounted on frame 34. The crank arm of linkage 109, which is fastened to the inner end of stub shaft 114, actuates adjusting plate 107 which mounts microswitch 108. By this arrangement, any rotary motion of worm gear 110 as the result of operation of knob 112 in either direction will actuate plate 107 by the connected linkage and thus vary the relationship of adjusting plate 107 and with it the position of microswitch 108 to any point in the circumference within a reasonable range of degrees. It will be noted that varying the mounting position of microswitch 108, by turning knob 112, will enable the operator to pulsate the wax dropper initiating cycle at such time so as to have the falling drop of wax deposit itself on the label, folder or the like at such location as may be desired.

Coil springs 116 are inserted in sockets in valve head 100 and abut against the adjacent face of adjusting plate 107, thereby urging valve head 100 against the adjacent recessed face 73 of vacuum wheel structure 70. The abutting faces between the parts are, of course, finished and the selection of material for the parts may be modified in accordance with requirements. It is proposed that the valve head 100, for instance, be made of bronze while the abutting vacuum wheel be made of cast iron or the like.

Associated with vacuum wheel 70 which transfers the labels or similar data containing material, there is provided a magazine for containing such labels or data containing material which is to have deposited thereon drops of adhesive or wax and applied to receptacles, packages, containers and the like. The magazine, generally indicated at 120, is best illustrated in FIGS. 8 through 11, and comprises an elongated bottom plate 121 upon which is mounted side plates 122 and 123 of angular form with upright walls 124 and 125 extending at right angles therefrom and defining the width of magazine 120. Slots 126 are formed in side plates 122 and 123 to receive fasteners 127 which extend through bottom plate 121 and which when loosened, permit side plates 122 and 123 to be moved toward or away from each other to define the selected width of magazine 120. Fasteners 127 may be spring retained or screw or nut type. The form of this fastener structure merely provides convenience in adjustment of the side plates and permanently holds the plates when once adjusted. It will be understood that the upright walls 124 and 125 of the magazine must be modified to accommodate many forms and sizes of labels, folded material and the like which are to be handled by the assembly.

A hopper slide adapted to rest between walls 124 and 125 and upon plate 121, shown in detail in FIGS. 12 to 14, is in the form of a box-like tray 128, the inner end of which i.e., the end adjacent the vacuum wheel 70, is formed with upwardly bent tongues 129. The opposite end of tray 128 is formed with an outwardly extending stud 130 to which is attached a ball-like knob 131, shown in FIGS. 8 and 10. Extending longitudinally over the entire top length of the hopper slide structure are a plurality of spaced rods 132 which are welded into position as shown in FIG. 12. On the inside bottom of the hopper slide are fixed nuts 133 which have internal threaded openings communicating with openings in the bottom of the hopper slide. Screws 134 (FIG. 8) extend through slots 135 (FIG. 10) in bottom plate 121 and engage in the threaded apertures in nuts 133. Slots 135 are of sufficient length to permit the shifting of the slide lengthwise within the limits of slots 135. Springs 136 (FIG. 8) mounted on screws 134 abut the head of screw 134 and the bottom plate 121 to provide friction to retain the parts in adjusted position. Bottom plate 121 is secured by screws 138 (FIG. 1) onto a bracket-like structure 139 to the frame 34. It will be noted that screws 138 securing the magazine assembly 120 on supporting frame 34 extend through arcuate slots 140 in bracket-like structure 139, whereby the magazine assembly can be changed in its angular relation to vacuum wheel 4 to provide maximum efficiency and association of the pick-up arms with the labels or other material in the magazine.

In connection with the adjustments of the magazine assembly 120 heretofore described, it will be noted that the elongated slots 135, shown in FIG. 10, are of particular value in permitting movement of parts away from the vacuum wheel 70 which will facilitate loading the hopper or permitting adjustments should a jamming occur in the feeding of the labels or the like. The labels or other material 141 to be applied to packages and the like are placed onto the hopper slide in an upright position, the foremost label resting against the tongues 129 with the rest of the stack leaning against the foremost label and initially filling up the rest of the slide. A block 141a (FIG. 8) maintains labels 141 erect and under pressure.

During the course of normal operation, it sometimes becomes necessary for various reasons to interrupt the feeding of labels 141 and the like from magazine 120 by withdrawing the foremost label or the like out of the range of the pick-up. This is accomplished by the use of vertical fingers 142 (FIG. 8) mounted on a cross member 142a carried by a rocker shaft 143. Rocker shaft 143 is connected with a linkage 144 having a suitable swivel connection or the like with a member 145. Member 145 includes one lateral arm 145a (FIG. 9) normally urged by an adjustable spring 145b in one direction and a separate oppositely extending arm 145c connected with a solenoid 146. It will be noted that the fingers 142 are suitably spaced so that they will not abut against the tongues 129. An adjusting screw 145e is movable towards and away from the outer surface of arm 145c to provide exact normal positioning of the fingers 142 so that these fingers will perform their intended function.

The function of this mechanism is two-fold. First, it is used to provide a fine adjustment of the position of the labels or the like in the magazine in relationship to the ports of the transfer vacuum wheel, and secondly, if for any reason the pick-up or feed is to be interrupted, as for instance by a missing container in the feed system, solenoid 146 will be energized by a microswitch 193 as will be hereinafter explained to counteract the spring load of member 145, thereby swinging fingers 142 inward in the direction of the stacked labels or the like in the magazine, forcing the stack back and removing the foremost label out of the path of the detaching means.

An additional attachment is provided for magazine 120 to insure proper and dependable feeding of labels 141 or other material which are to be removed by vacuum wheel 70 by securing and holding the stacked portion in the magazine adjacent to the foremost label or the like being detached and to prevent accidental removal of the second or adjacent label which might result in double feeding. This additional attachment includes a pair of clamping pads 150 (FIG. 9) which are adjustably held on pivots 151 by rods 152. Rods 152 are carried on posts 153 by clamps 154 and are urged towards each other so that pads 150 will grip the end portion of the stack through the action of connecting spring 155. Clamps 154 have projections connected together by yielding link 156 and this arrangement permits the simultaneous inward and outward swinging movement of rods 152 and their pads 150 to alternately grip and release the end portion of the stack of labels or the like in synchronized association with the operation of vacuum wheel 70.

The assembly constitutes a spring loaded clamp and pads 150 are separated at appropriate intervals by an operating rod 157 connected at its inner end to a post projection 158 and having a cam follower 159 at its outer end disposed for engagement with cams 90 mounted on the outer face of vacuum wheel 70, as shown in FIG. 1. By this arrangement cam follower 159 is actuated by the cam 90 of the vacuum wheel 70 to move rods 152 and their pads 150 outwardly against the action of spring 155 to release the pads 150 from contact with the end portion of the stack of labels or the like in the magazine 120.

It will be understood that the foregoing action is synchronized with the functioning of vacuum wheel 70, whereby pads 150 will be in clamping position with the end portion of the stack of labels when one of the labels is being removed from the stack by suction from one of the passing ports of the vacuum wheel 70. During the interval between the action of the vacuum ports, pads 150 are free from spring pressure by action of cams 90, thereby permitting the stack of labels or the like to move forward to replace any that may have been removed by the vacuum ports.

In addition to the foregoing, there is provided an overhead guide 160 (FIGS. 8 and 9) which consists of a flat blade held by a bracket 161 which extends tranversely of the magazine 120 and is provided with vertical openings 162 to permit the passage of the posts 153 therethrough to form vertical guides therefor. The outer end of the transversely extending bracket 161 is fixed to a threaded post 163, as shown in FIG. 11, and is in threaded engagement therewith so that rotation of a knob 164 will raise and lower bracket 161 together with overhead guide 160 to provide appropriate adjustment therefor. Guide 160 directly overlies the foremost labels or the like contained in the magazine for restraining and/or correcting the line-up of the latter.

It is intended that the preferred adhesive be in the form of a hot liquid wax or the like and is to be dispensed in synchronized association with the labels advanced by the vacuum wheel 70 so that a drop of the hot liquid wax will be available and applied to each label or the like as it is presented to a position immediately below wax dropper 2. Wax dropper or dispenser, indicated generally by reference character 2 and disclosed more in detail in FIG. 2, forms a part of a separate application Ser. No. 268,363 now U.S. Patent 3,280,860. However, in order that the operation of the instant combined assembly and its function be fully understood, this adhesive dispenser or wax dropper is generally described herein.

Wax dropper is mounted against panel 34 by screws, one of which is shown at 171a (FIG. 2) which are movable in slots 171b in the panel and thereby permit adjustment of wax dropper 2 in a vertical plane facilitating a height variation between vacuum wheel assembly 4 and a nozzle 173 of wave dropper 2. The melting pot 170 which may be made in the form of an aluminum casting providing a wax or adhesive container is retained in a housing 171 and insulation 172 is provided between melting pot 170 and housing 171. Pot 170 is provided with a discharge nozzle 173 having a vertical port 174 therein and adjusting screws 175 support melting pot 170 and nozzle 173 and thereby permit its vertical adjustment so that the relationship of discharge port 174 may be properly associated with a label A being presented by vacuum wheel 70 immediately therebeneath.

Within pot 170 there is provided an inverted perforated basket 176 for supporting unmelted wax or adhesive 177, thus permitting only melted wax or adhesive to be contained in the lower or discharge portion of pot 170. A cylindrical filter screen 178 is vertically arranged about the vertical medial portion of pot 170 and is generally axially aligned with discharge port 174. A vertical rod or drive shaft 180 carries at its lower end a needle valve 181 for opening and closing discharge port 174 to permit a drop of adhesive or wax to be dispensed and to fall by gravity onto the label or the like, indicated at A. Rod or drive shaft 180, operating needle valve 181, is axially aligned with discharge port 174 and is coupled at 182 with a rotary solenoid positioned in a housing 183 supported in a clamp ring 184 by supports 185 on a supporting plate 186 mounted on top of pot assembly 170. Solenoid housing 183 is formed with external threads 183a which are threaded within clamping ring 184, whereby housing 183 and the rotary solenoid contained therein may be vertically adjustable within clamping ring 184 to insure operation of needle valve 181 by the rotary solenoid in accordance with requirements.

Depending on the size of the drop of wax required, which will determine what size of nozzle to be used, a first adjustment will be made favoring a condition whereby the rotary motion of the armature is restricted, which in turn also restricts the lateral lift of needle valve 181, but requires a longer electrically energized condition to dispense a like amount of fluid under an opposite condition which would be a high lateral lift but a short electrical on period. This is done to fully utilize an electrical time delay circuit with substantial accuracy rather than chance a possible low voltage effect on a short impulse originating from a half wave 60 cycle A.C. supply source. Therefore, our first adjustment is made by adjusting solenoid housing 183 by means of its screw threads 183a in stationary clamp ring 184 to a position which is a compromise of reasoning of the condition just cited, meaning lift and duration of delay.

It will be understood that adhesive or wax dropper 2 includes a heater 188, a suitable connection 189 with a source of power control for supplying the necessary D.C. impulses to rotary solenoid 183, pilot lights and other structural elements essential to the provision and operation of wax dropper 2 and its synchronized operation with the travel of the label or the like by vacuum wheel 4.

Generally in the use of this wax dropper or adhesive applicator 2, rotary solenoid assembly 183 is raised or lowered by means of adjusting threads 183a to a position to provide appropriate function, compensating for lift and duration of delay.

The assembly further includes a control housing 190 (FIG. 1), including a control panel 190a having a series of control switches 209, 220, 223 and 245, a variable time delay 236, and a cut-off 192 in the nature of a microswitch 193 at the bottom of the package magazine 26 positioned to sense the presence of the lowermost article and to disable the assembly when the supply of articles to which the labels or other material are to be attached has become depleted.

It is intended that the source of vacuum to be supplied to vacuum wheel 4 be provided by a unit comprising a motor, vacuum pump, tank and essential accessories and that the vacuum source be in the nature of a unit capable of being mounted within the base of the assembly or remote therefrom, in which latter event the same vacuum source could be utilized in connection with the operation of a number of installations of the present apparatus.

In FIG. 16 there is generally illustrated a unit capable of providing the required vacuum for the operation of the vacuum wheel. The unit includes a motor and vacuum pump assembly 195, a pump filter 196, an appropriate tank 197, a check valve 197a, a pressure indicating gauge 198 and tank outlet 199 which communicates with vacuum wheel 70 by the branch conduits 200 and 201 and hose connections 200a and 201a. It will be noted that branch pipe 200–200a is provided with a solenoid valve 202, while branch pipe 201–201a is provided with a manual valve 203 and that these conduits are connected with tubular outlets 105 and communicating arcuate grooves 102 and 103 of valve head 100.

This vacuum producing unit, when the vacuum pump motor is operated to drive the vacuum pump, produces a condition of negative pressure in tank 197 and this negative pressure in tank 197 is in rating the equivalent in vacuum inches as set by the check valve 197a. The lines from tank 197 are subjected to the same vacuum as in tank 197 and, likewise, grooves 102 and 103 in valve head 100 are subject to the same vacuum rating. Should solenoid valve 202 be pulsated there is an instant response of full vacuum or no vacuum in line 200–200a controlled by valve 202. Manual valve 203 controls its line and may be adjusted to different vacuum influence in accordance with its setting, whereby groove 103 controlled by its operation may become less effective in building up and retaining a high vacuum rating, if so desired.

Referring now to FIG. 17 which is a schematic diagram of the electric control for the apparatus, it is intended that this control normally be contained in control housing 190. The circuit is indicated as a 110 volt A.C. supply at terminals 205 connecting with input conductors 206 and 207. A first circuit, which operates vacuum pump 195, follows conductor 206a, fuse 208, toggle switch 209a, line 210, a motor 211, a line 210a and conductor 207. A parallel circuit flows through conductor 206, fuse 208, toggle switch 209, a conductor 212, a pilot light 214 and conductor 207.

A second circuit includes conductor 206a, fuse 215, toggle switch 209a, microswitch 193, and a relay coil 216 to conductor 207. This circuit is to sense the presence of an article in the article magazine 26.

A third circuit which controls two way vacuum solenoid 202, includes conductor 206, fuse 215, contacts 217 of control switch 220 and a solenoid 202 to conductor 207. A parallel circuit flows through conductor 206, fuse 215, relay contacts 219 of relay 216, and solenoid 202 through conductor 207.

A fourth circuit which controls hopper solenoid valve 146 (FIG. 16), includes conductor 206, fuse 215, contacts 217 of toggle switch 220, solenoid 146 and conductor 207. A parallel circuit follows conductor 206, fuse 215, relay contacts 222 of relay coil 216, solenoid 146 and conductor 207.

The wax dropper, and in particular its valving means, will be subject to a control system traced in the circuit diagram of FIG. 17 as follows: through conductor 206, fuse 215a, drop toggle switch 223, microswitch 108, a conductor 225, the normally closed contacts 226 of a time delay relay 227, a terminal post 228 of a A.C. input of a rectifier 229, a terminal post 230 of the A.C. return, a conductor 231 and conductor 207. A further connection is made by post 228a, conductor 232a, relay 233 and conductor 207. It will be noted that a parallel circuit exists between conductor 206 and conductor 232 by the presence of a relay contact 234.

A further branch of this time delay circuit is in conductor 206, fuse 215, hopper toggle switch 223, and microswitch 108; likewise, there is a parallel circuit over a relay contact 234 to a resistor 235a, potentiometer 236a, terminal post 237, time delay relay 227, and conductor 207; as well as also from post 237 to time delay relay contact 238, normally closed, to a time delay relay contact 239, normally open, to a resistor 240 and out to conductor 207. There is a dividing branch between contacts 238 and 239 to a condenser 241 and conductor 207. In parallel with the time delay relay 227 there is provided a condenser 242. In addition, and part of the time delay relay circuit and pertaining to the wax dropper, is the D.C. output terminal side 234 and 244 of rectifier 229 which connects with rotary solenoid 183.

The circuit to the wax heater element is as follows: from conductor 206, fuse 215, heater toggle switch 245a, thermostat 246, a heater 247 to conductor 207. A pilot light is provided in parallel with the heater.

Referring to the general operation of the present invention, it will be noted from FIG. 1 that vacuum port wheel assembly 4 is mounted for rotary motion on an axis arranged in a horizontal plane above conveyor 20 passing along the table 22 positioned therebeneath. It will also be noted that wax dropper or adhesive applier 2 is positioned directly above vacuum port wheel 4 so that discharge port 174 of nozzle 173 of wax dropper 2 is approximately lying in a vertical plane extending through the longitudinal axis of rotating vacuum port wheel 4, which latter includes three label pick-up tubular inserts 75 projetcting radially from its periphery. In addition a label magazine 120 is adjustably positioned with respect to vacuum port wheel 4 so that the terminals of tubular inserts 75 will approximately contact the end label 141 to remove same from label magazine 120. The elements are synchronized to perform the various functions and the following descriptive matter is intended to disclose the operation.

Presuming that label magazine 120, shown in elevation in FIG. 8, is fully loaded and that package magazine 26 is likewise fully loaded, and with wax dropper 2 in operating condition in accordance with the disclosure of my application Ser. No. 268,363 now Patent 3,280,860, the various steps can begin, having in mind the circuit diagram of FIG. 17.

First the vacuum motor switch 209 is activated accelerating the vacuum pump output to a predetermined controlled negative pressure. It is understood that when vacuum motor switch 209 is activated two-way solenoid valve 202 is open and vacuum line 200–200a connecting with valve head 100 is in operating condition. Vacuum line 201–201a also leading to valve head 100 of vacuum wheel assembly 4 is in operating condition but valve 203 is restricted in such a way as to reduce the effect of the vacuum pump to a desired minimum to obtain equilibrium of expected vacuum inches in the area connected by line 201–201a and its companion groove 102. The main drive, which may be controlled from any source such as the conveyor unit or labeling mechanism, is initiated resulting in operation of the conveyor chain 20 and simultaneously the operation of vacuum wheel 4. Since conveyor chain 20 is divided evenly in sections by spaced lugs 28, and inasmuch as vacuum wheel 4 revolves in synchronism with conveyor chain 20, for each revolution of vacuum wheel 4 three sections of chair, i.e., three lugs, will have passed by. With magazine 26 loaded with packages or other articles 8, this will mean that for every passing lug of the chain there is an article 8 to go with it, which likewise coincides with one of the three ports 75 of vacuum wheel 4.

All switches on control panel 180 are turned on and assuming that the heat has been on in wax pot 170 for a sufficient length of time to have melted wax 170 to the proper consistency, the presence of a container 8 for conveyor 20 is sensed by microswitch 193. Revolving vacuum wheel 4 picks up a label 141 or the like by means of one of the vacuum ports 75 thereon, which closes the mouth of port 75 and activates vacuum trigger 81 which in turn activates wax dropper switch 108 that fires the time delay, activating solenoid 183 on the wax dropper 2 at the precise time that label 141 held to the port of vacuum wheel 75 is immediately below wax dropper valve orifice 174, thereby allowing a measured amount of wax 177 to drop on label 141 as the vacuum wheel 4 continues to turn in a direction away from the label or folder hopper 120.

From the point where wax 177 is dropped onto the folder 141, vacuum wheel 4 turns 180 degrees, where, at that precise moment the container 8 moving on continuously moving conveyor 20 is immediately below port 75 of vacuum wheel 4 holding label or folder 141, and, as both folder 141 on the vacuum wheel 75 and container 8 are moving at the same identical speed, the effect is to roll the folder 141 onto container 8, while, at the same moment, the vacuum is shut off from port 75 permitting folder 141 to remain attached to container 8 through the adhesion caused by the presence of wax 177. Momentarily folder 141 is pressed to container 8 by means of the "give" in rubber tip 76 on port 75 of vacuum wheel 4.

It is understood that if one container 8 is following another the action will be similar to the above and continuous, as each of the three ports 75 on vacuum wheel 4 revolves to the pick-up position of the folder 141 from the hopper 120; that if there is a gap between containers 8, the pick-up of the labels, folders or the like 141 by vacuum ports 75 stops until such time as container 8 is again sensed; that if there is no release of the folders or the like 141 from the hopper 120 to vacuum wheel port 75, wax dropper 2 is not activated and does not release a drop of adhesive 177.

It will be understood that the present apparatus provides for complete adjustment in the controls to obtain maximum operation including regulation of the various adjustments for wax dropper 2 and label magazine 120 to insure in the latter instance that single labels 141 are removed in regular sequence by respective vacuum ports 75 of vacuum wheel 4.

It is important to note the function of actuator pin or trigger 81, best shown in FIG. 2. These pins 81 function as the actuator and, as can be seen, have a slidable fit in the bearing. Spring 88 merely passes crosswire through port 78 of insert 75 but does not interfere with the passage of air. In addition, pins 81 because of their sliding fit do not pass air in any appreciable amount. Thus if port 80 is connected to a vacuum source of any kind, the attempted effort of the vacuum pump to render insert 75 or port hole equal of negative pressure will be inadequate as long as the port hole permits air to pass in an amount exceeding the capacity of the pump. As soon, however, as a port hole is closed by any kind of interference, thereby interrupting the flow therethrough, a pocket is formed within the cavity of insert 75 which is also extended to the axis of bore 82, wherein a negative pressure balance equal to the vacuum pump rating is obtained, which is in p.s.i. so much less than the atmospheric pressure that the influence of the latter against actuator pin 81 becomes by far greater than the counteracting spring 88 which will yield to such superior force and thereby permit pin 81 to be seated in the rim of recess 82 with its own head, and a practical seal is obtained issuing an equilibrium of forces for as long as the port hole remains closed.

This pneumatic action has been converted to a physical control of microswitch 108, which in turn will initiate the beginning of an electrical cycle of events when such initiation is warranted by physical sensing of the extracted or retracted pin 81 and differentiate between its position as to whether to start such a cycle or not. Microswitch 108 carried by adjusting plate 107 and actuator pin 8 arrangement may be seen in FIGS. 1, 2 and 3. Actuator pin 81, when projected, will pass microswitch arm 108a because of the smaller diameter of pin 81 with respect to its head and thus there will be no operation of microswitch 108. However, when pin 81 is retracted, its larger head will come into range of the interposing spring arm 108a and cause it to be actuated, which in turn sets off an electrical cycle. It must be taken into consideration that there are variables which require compensation in some form. Such variables include the exact timing of the electrical cycle to start relative to any given position of the vacuum wheel while going through its own cycle. As pointed out previously, the given position of the vacuum wheel is determined by control knob 59 and its associated parts.

I claim:

1. Apparatus for applying labels, folders or the like to articles moving along an article feed path: comprising:
    (a) label storage means;
    (b) label transfer means disposed in proximity to said label storage means and the article feed path and adapted to remove a label folder or the like from said label storage means and transport same through a label transport path and into engagement with an article when moving therealong; and
    (c) adhesive means disposed in proximity to said label transport path to deposit by gravity a predetermined amount of adhesive upon a label, folder, or the like when transported through said label transport path and after removal from said label storage means.

2. The apparatus of claim 1 wherein said label transfer means rotates about a horizontally disposed axis of rotation.

3. The apparatus of claim 1 wherein:
    (a) said label transfer means includes a plurality of label pickup members;
    (b) said label transport path includes a label pickup portion; a label transport portion and a label release portion; and
    (c) vacuum means coact with said plurality of label pickup members during movement thereof through said label pickup portion to effect removal of labels from said label storage means, and during movement thereof through said label transport portion to transport labels into engagement with an article moving along the article feed path, said vacuum being thereafter relieved from said label pickup members when in said label release portion.

4. The apparatus of claim 3 wherein said vacuum means includes:
    (a) vacuum source means;
    (b) a first vacuum path means interconnecting said vacuum source means to said label pickup members during movement thereof through said label pickup portions of said label transport path;
    (c) vacuum control means disposed in said first vacuum path to either connect or disconnect same from said vacuum source means;
    (d) second vacuum path means interconnecting said vacuum source means to said label pickup members during movement thereof through said label transport portions of said label transport path; and
    (e) selection means coacting with said selectively actuated vacuum control means to operate same and thereby control the removal of labels from said label storage means.

5. The apparatus of claim 4 wherein said selection means is responsive to the presence or absence of articles in a predetermined part of the article feed path.

6. The apparatus of claim 5 wherein:
    (a) said selectively actuated vacuum control means is a solenoid; and
    (b) said selection means is an electrical switch connected to said solenoid through a source of electrical potential.

7. The apparatus of claim 4 wherein said second vacuum path means includes a selectively actuated valve to modify the degree of interconnection between said vacuum source means and said label pickup members.

8. The apparatus of claim 1 including label sensing means disposed to sense the presence of labels on said label transfer means and coacting with said adhesive means to operate same and control the release of adhesive only when a label is disposed on said label transfer means and being transported thereby from said label storage means towards said adhesive means.

9. The apparatus of claim 8 including:
    (a) selectively adjustable positioning means coacting with said label sensing means to vary the position thereof and therefore the time of coaction of said label sensing means and a label when transported along said label transport path to thereby control the time when adhesive is released and the disposition of the adhesive of the label.

10. The apparatus of claim 8 wherein:
    (a) said adhesive means includes a solenoid actuated valve; and
    (b) said sensing means includes an electrical switch disposed for operation by a label and electrically interconnected through a source of electrical potential to said solenoid to operate same.

11. An apparatus for applying labels, folders and the like to articles carried by a conveyor adapted to move articles along a predetermined article feed path, comprising:
    (a) a platform disposed in proximity to the conveyor;
    (b) a label feeding and applying mechanism carried by said platform so as to overlay the conveyor;
    (c) said label feeding and applying mechanism including a label storage magazine, and a vacuum wheel rotatable about a horizontal axis and having a plurality of radially extending vacuum operated label pickup members each of which is adapted, during the rotation of said vacuum wheel, to remove a label from said label storage magazine and transport same along a predetermined label feed path and into engagement with an article when moving therealong;
    (d) an adhesive dropper disposed above said vacuum wheel and responsive to the presence of labels on said label pickup members to drop by gravity a predetermined amount of adhesive on each label;
(e) drive means for driving said label feeding and applying mechanism;
(f) vacuum means for supplying vacuum to said rotatable vacuum wheel; and
(g) control means for controlling the operation of said vacuum means.

12. The apparatus of claim 11 wherein:
(a) said rotatable vacuum wheel includes first, valving means providing vacuum to each of said label pickup members when in position to pick up a label from said magazine, and second, valving means for providing vacuum to each of said label pickup members after they pass the position wherein they pick up a label and until they arrive at a position to deposit the label upon an article; and
(b) said control means including article responsive means responsive to the presence and absence of articles to control the operation of said first valving means so as to prevent the pick up of a label thereby when there is no article to be labeled.

13. The apparatus of claim 12 wherein:
(a) said article responsive means includes a first electrical switch disposed for coaction with the articles to be labeled; and
(b) said control means further includes solenoid means responsive to actuation of said first electrical switch to control the application of said vacuum to said first valving means.

14. The apparatus of claim 11 including adhesive control means responsive to the presence and absence of labels on said label pickup members and coacting with said adhesive means to control the application of adhesive to the labels.

15. The apparatus of claim 14 wherein said adhesive control means includes a second electrical switch disposed in position to be intercepted by a portion of a label when being transported by a label pickup member to said adhesive means.

16. The apparatus of claim 15 wherein said second electrical switch is disposed for adjustable positioning such that the operation of said adhesive means may be selectively controlled.

17. The apparatus of claim 13 including label removal control means carried by said label storage magazine and responsive to actuation of said first electrical switch to prevent the removal of labels from said label storage magazine by moving the labels away from said label feed path.

18. Apparatus for applying labels, folders or the like to articles moving along an article feed path, comprising:
(a) label storage means;
(b) vacuum operated label transfer means including a plurality of label pickup members disposed in proximity to said label storage means and the article feed path and adapted to remove a label from said label storage means and transport same through a label transport path and into engagement with an article when moving therealong;
(c) said label transport path including a label pickup portion; a label transport portion and a label release portion;
(d) a first vacuum path means interconnecting said vacuum source means to said label pickup members during mivement thereof through said label pickup portions of said label transport path;
(e) selectively actuated vacuum control means disposed in said first vacuum path to either connect or disconnect same from said vacuum source means;
(f) second vacuum path means interconnecting said vacuum source means to said label pickup members during movement thereof through said label transport portions of said label transport path; and
(g) selection means coacting with said selectively actuated vacuum control means to operate same and thereby control the removal of labels from said label storage means.

19. The apparatus of claim 18 wherein said selection means is responsive to the presence or absence of articles in a predetermined part of the article feed path.

20. The apparatus of claim 19 wherein:
(a) said selectively actuated vacuum control means is a solenoid; and
(b) said selection means is an electrical switch connected to said solenoid through a source of electrical potential.

21. The apparatus of claim 18 wherein said second vacuum path means includes a selectively actuated valve to modify the degree of interconnection between said vacuum source means and said label pickup members.

22. A vacuum pickup and transport mechanism for labels, folders and the like, comprising:
(a) a fixedly disposed valve plate having formed therein a first vacuum passage and a second vacuum passage;
(b) a vacuum wheel disposed for coaction with said vacuum plate and having formed therein a plurality of label pickup passages;
(c) vacuum wheel rotating means for rotating said vacuum wheel to bring said label pickup passages into communication with said first vacuum passage and said second vacuum passage;
(d) a vacuum source;
(e) a first vacuum path interconnecting said vacuum source with said first vacuum passage;
(f) a selectively controlled valve for said first vacuum path to open and close same and thereby control the vacuum to said first vacuum passage;
(g) a second vacuum path interconnecting said vacuum source to said second vacuum passage; and
(h) condition responsive means for controlling operation of said selectively controlled valve to operate same and cut off the vacuum thereto in response to a given condition;
(i) the vacuum to said second passage remaining unaffected by operation of said selectively controlled valve.

23. The mechanism of claim 22 wherein:
(a) said vacuum wheel pickup passages each comprise a radially extending bore and a transverse bore extending from said radially extending bore to a face of said vacuum wheel;
(b) said first and said second vacuum passages in said valve plate are each in the form of arcuate grooves in the face of said valve plate;
(c) biasing means urge said valve plate and said vacuum wheel against each other so that said arcuate grooves communicate with said transverse bores.

24. The mechanism of claim 22 wherein:
(a) said selectively controlled valve comprises a solenoid controlled valve; and
(b) said condition responsive means includes an electrical element interconnected through an electrical potential source to said solenoid to operate same.

25. The mechanism of claim 22 wherein:
said second vacuum path also includes a valve means.

26. The apparatus of claim 11 wherein said vacuum wheel includes:
(a) a hub portion having a bore therethrough;
(b) an elongated longitudinally extending slot formed in said bore;
(c) a driven shaft assembly passing through the bore in said hub, said driven shaft assembly being formed with an axial bore at its outer end portion and driving means at its opposite end portion;
(d) means for connecting said vacuum wheel hub with the outer end portion of said shaft for adjustment thereabout including an arcuate slot in the outer end portion of said driven shaft, said arcuate slot extending longitudinally of the shaft and opening into the bore of said hub;

(e) a reciprocating plug positioned in the bore of said shaft;

(f) a pin fixed to said reciprocating plug and extending laterally through said arcuate slot and beyond the outer surface of said driven shaft for engagement in the longitudinal slot formed in the bore of said hub portion of the vacuum wheel; and (g) means reciprocating said plug to adjust the position of said wheel with respect to the articles moving along said label feed path.

27. A pickup mechanism for labels, folders and the like, comprising:

(a) a vacuum wheel including a hub portion having a bore therethrough;

(b) an elongated longitudinally extending slot formed in said bore;

(c) a driven shaft assembly passing through the bore in said hub, said driven shaft assembly being formed with an axial bore at its outer end portion and driving means at its opposite end portion;

(d) means for connecting said vacuum wheel hub with the outer end portion of said shaft for adjustment thereabout including an arcuate slot in the outer end portion of said driven shaft, said arcuate slot extending longitudinally of the shaft and opening into the bore of said hub;

(e) a reciprocating plug positioned in the bore of said shaft;

(f) a pin fixed to said reciprocating plug and extending laterally through said arcuate slot and beyond the outer surface of said driven shaft for engagement in the longitudinal slot formed in the bore of said hub portion of the vacuum wheel; and (g) means reciprocating said plug.

28. The pickup mechanism of claim 27 wherein said means for reciprocating said plug and the laterally extending pin, includes:

(a) a rotating control knob disposed at the end of said shaft;

(b) means fixing said rotating knob against longitudinal movement; and (c) a screw member connecting the plug and the rotating control knob.

29. The pickup mechanism of claim 27 wherein said means for fixing said control knob against longitudinal movement, comprises:

(a) a cylindrical body fixed to said control knob and extending into the outer end of the bore in said shaft; and (b) key means locking the cylindrical body against longitudinal movement but permitting rotary movement.

30. The apparatus of claim 11 wherein said storage magazine includes:

(a) an elongated bottom plate and a pair of laterally adjustable side plates;

(b) said side plates providing upright walls extending at right angles to the bottom plate;

(c) a slide member in the form of an elongated box-like tray positioned between said side plates for receiving a stack of labels, folders and the like;

(d) said box-like tray having an upwardly extending bent tongue at its discharge end adjacent the vacuum wheel;

(e) means for adjusting said tray longitudinally of said bottom plate;

(f) means securing said tray in adjusted position;

(g) a pair of spaced arms projecting upwardly at the delivery end of said tray for engaging the end of the stack of labels, folders or the like;

(h) means for actuating said arms to shift said stack away from said vacuum wheel;

(i) clamp means normally engaging the end portion of the stack of labels and the like at the delivery end of said magazine when the vacuum wheel is removing the outer label; and (j) means for releasing the clamp means to permit the stack of labels to be moved toward the delivery end.

31. A feed magazine for labels, folders and the like, comprising:

(a) an elongated bottom plate and a pair of laterally adjustable side plates, said side plates providing upright walls extending at right angles to the bottom plate;

(b) a slide member in the form of an elongated box-like tray positioned between said side plates for receiving a stack of labels, folders and the like, said box-like tray having an upwardly extending bent tongue at its discharge end;

(c) means for adjusting said tray longitudinally of said bottom plate;

(d) means securing said tray in adjusted position;

(e) a pair of spaced arms projecting upwardly at the delivery end of said tray for engaging the end of the stack of labels, folders or the like;

(f) means for actuating said arms to shift said stack away from said discharge end;

(g) clamp means normally engaging the end portion of the stack of labels and the like at the delivery end of said magazine when the outer label is being removed; and (h) means for releasing the clamp means to permit the stack of labels to be moved toward the delivery end.

32. The magazine of claim 31 wherein said clamp means includes a pair of pads carried by pivoted arms, said arms being normally urged into clamping position by spring means connected therewith.

33. The magazine of claim 32 wherein there are means connected to said arms for urging them into open position.

34. The magazine of claim 31 wherein said clamp means includes:

(a) a pair of pivotally mounted pad members carried by elongated arms;

(b) spring means normally urging said pad members toward gripping position;

(c) vertical post members at each side of the magazine and supported thereby;

(d) means connecting said arms to said post members for vertical adjustment therealong; and (e) an operating arm extending forwardly of the magazine and connected with said posts for rotating same to open said clamping means to release the outer labels.

35. The magazine of claim 31 wherein an overhead guide in the nature of a plate is adapted to be positioned above the end portion of the stack of labels, said overhead guide being mounted on a transverse plate formed with spaced openings for the passage of said vertical post members at each side of said magazine.

36. The magazine of claim 31 wherein a pair of spaced arms projecting upwardly at the delivery end of the tray for engaging the end of the stack of labels, folders and the like are mounted in a normal position by spring means carried by the assembly, and motor means are provided for actuating said spaced arms against the action of the spring means.

37. The magazine of claim 36 wherein means are provided for adjusting said overhead guide including a screw member fixed to the magazine and engaging a threaded portion of an arm connected to said plate.

38. An automatic method of applying a label, folder or the like to serially presented articles which consists in the steps of:

(a) providing a stack of labels, folders or the like;

(b) removing the end label from the stack by gripping means to a first station;
(c) applying a drop of adhesive or wax by gravity to the upper surface of the label at said first station;
(d) moving the label with its drop of adhesive to a position immediately below said first station with the face of the label containing the drop of adhesive facing downwardly;
(e) moving an article under and into engagement with the face of the label containing the adhesive;
(f) applying pressure to the label; and
(g) simultaneously releasing the gripping means.

References Cited

UNITED STATES PATENTS

| | | | |
|---|---|---|---|
| 1,315,737 | 9/1919 | Milmoe | 156—571 |
| 1,429,095 | 9/1922 | Peters et al. | 156—568 |
| 2,170,068 | 8/1939 | Tayler et al. | 156—568 |
| 2,195,111 | 3/1940 | Kagley | 156—364 |
| 2,311,969 | 2/1943 | Schenck et al. | 156—571 X |
| 2,703,660 | 3/1955 | Von Hofe et al. | 156—571 X |
| 3,200,719 | 8/1965 | Welch | 156—571 X |
| 3,280,860 | 10/1966 | Schneider et al. | 141—160 |
| 3,291,675 | 12/1966 | Orloff et al. | 156—570 X |

FOREIGN PATENTS

| | | |
|---|---|---|
| 670,362 | 4/1952 | Great Britain. |

EARL M. BERGERT, Primary Examiner

T. R. SAVOIE, Assistant Examiner

U.S. Cl. X.R.

156—363, 568, 571, 578; 271—27